United States Patent [19]

Sun

[11] 4,246,623

[45] Jan. 20, 1981

[54] PROTECTIVE RELAY DEVICE

[75] Inventor: Shan C. Sun, Pittsburgh, Pa.

[73] Assignee: Westinghouse Electric Corp., Pittsburgh, Pa.

[21] Appl. No.: 940,801

[22] Filed: Sep. 8, 1978

Related U.S. Application Data

[63] Continuation of Ser. No. 648,689, Jan. 13, 1976, abandoned, which is a continuation of Ser. No. 527,460, Nov. 26, 1974, abandoned.

[51] Int. Cl.² .............................................. H02H 3/08
[52] U.S. Cl. ........................................ 361/97; 361/94; 361/196
[58] Field of Search .................. 361/93, 94, 95, 96, 361/97, 98, 100, 31, 196, 44, 45; 307/293

[56] References Cited

U.S. PATENT DOCUMENTS

| | | |
|---|---|---|
| 3,290,556 | 12/1966 | Graham et al. . |
| 3,319,127 | 5/1967 | Zocholl et al. ..................... 361/96 |
| 3,444,434 | 5/1969 | Zocholl ................................ 361/97 |
| 3,536,957 | 10/1970 | Iverson et al. . |
| 3,555,357 | 1/1971 | Cregson et al. . |
| 3,582,982 | 6/1971 | Swinehart . |
| 3,634,729 | 1/1972 | Hendry et al. . |
| 3,654,519 | 4/1972 | South . |
| 3,656,026 | 4/1972 | Zocholl ................................ 361/97 |
| 3,786,311 | 1/1974 | Hobson et al. . |
| 3,803,455 | 4/1974 | Willard . |
| 3,831,061 | 8/1974 | Boyd . |

FOREIGN PATENT DOCUMENTS

| | | |
|---|---|---|
| 1961686 | 6/1971 | Fed. Rep. of Germany . |
| 2065084 | 6/1971 | France . |
| 950596 | 2/1964 | United Kingdom . |
| 958775 | 5/1964 | United Kingdom . |
| 1069093 | 5/1967 | United Kingdom . |
| 1200025 | 7/1970 | United Kingdom . |
| 1240035 | 7/1971 | United Kingdom . |

*Primary Examiner*—Patrick R. Salce
*Attorney, Agent, or Firm*—D. R. Lackey

[57] ABSTRACT

An electrical device for protecting an alternating current network in which a static inverse time-overcurrent relay obtains network current information and relay circuit operating power from a current transformer having two secondary windings. Low transformer burden and accurate network information signals that are linearly responsive to a wide range of network current magnitudes are achieved through the use of a switching circuit that prevents the simultaneous operation of both secondary windings. The relay circuit employs an RC network with a short, precision time constant for curve shaping and employs digital counting techniques to provide time delay multiplication, precision time scale selection and a variable delay time variable in accordance with the magnitude of system current.

36 Claims, 9 Drawing Figures

PROTECTIVE RELAY DEVICE

This is a continuation of application Ser. No. 648,689, filed Jan. 13, 1976, which is a continuation of application Ser. No. 527,460, filed Nov. 26, 1974, both now abandoned.

BACKGROUND OF THE INVENTION

This invention relates in general to electrical devices employed for protection of alternating current networks.

In electrical quantity sensing devices of the prior art, the current information and relay circuit operating power was derived from two current transformers. Under some conditions at least one of the transformers was designed to saturate within the expected range of the current magnitudes. Other prior art devices utilized a current transformer in combination with a separate power source.

In static time delay relay circuits of the prior art it is common to employ a curve shaping device for providing relay characteristics similar to those of prior widely used electromechanical devices. Curve shaping arrangements are illustrated in U.S. Pat. No. 3,496,417 to N. D. Tennebaum dated Feb. 17, 1970; and U.S. Pat. No. 3,544,846 to F. T. Thompson dated Dec. 1, 1970.

BRIEF SUMMARY OF THE INVENTION

The invention provides a novel electrical quantity responsive device for the protection of an alternating current network. In its more specific form, the invention utilizes a transformer to alternately charge a power supply and provide a control quantity having a magnitude proportional to the magnitude of the electrical quantity in the alternating current network which is to be sensed. A detecting circuit is energized by the control quantity and provides a time delayed output signal which has an inverse time characteristic with respect to the magnitude of the control quantity. The time delay circuit includes RC network means and digital counting means for shaping a desired inverse time-response curve.

DESCRIPTION OF THE PREFERRED EMBODIMENT

Figure 1:
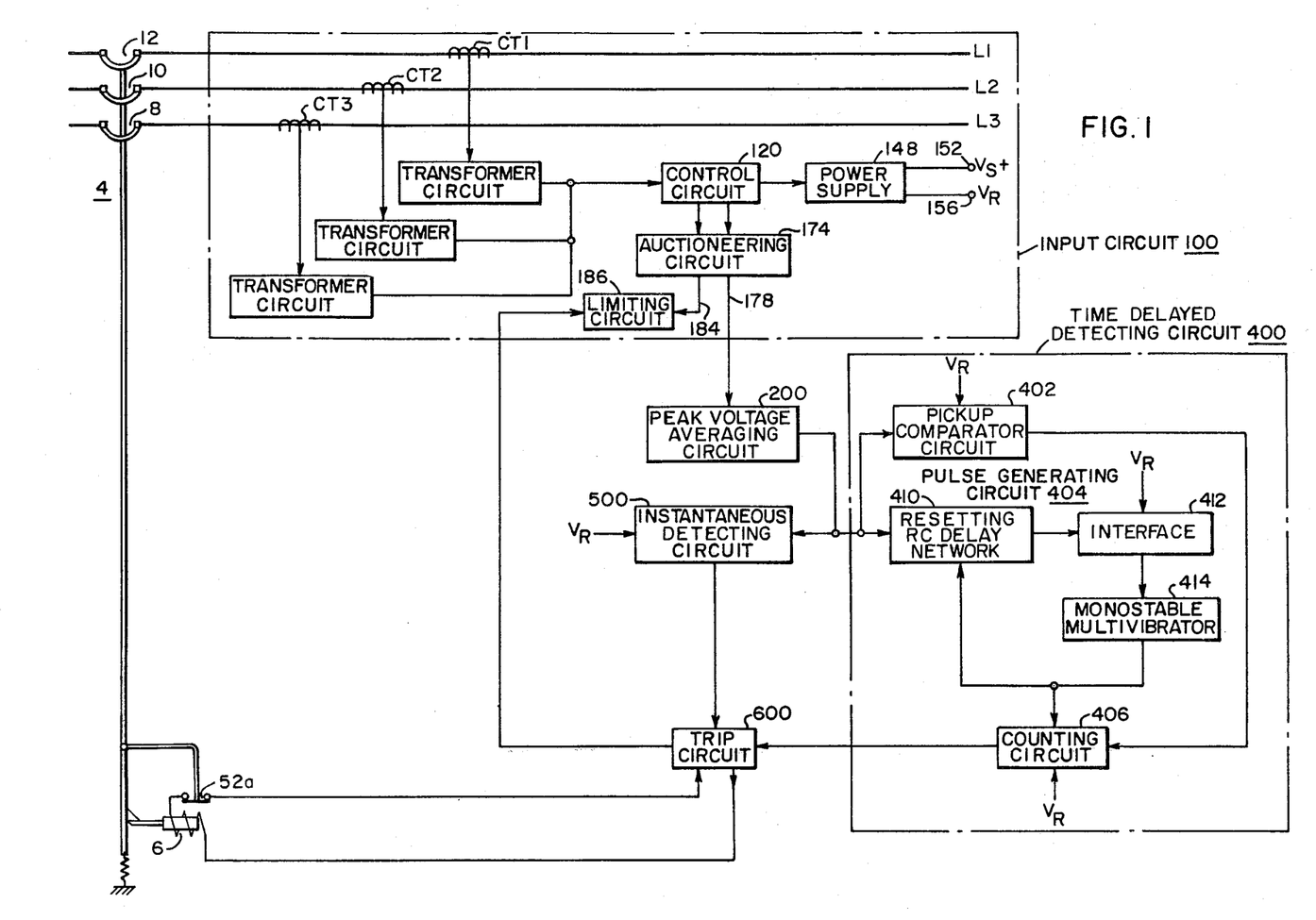
FIG. 1 is a block diagram of an electrical quantity responsive device protecting a three phase alternating current network and embodying the invention.

FIG. 1 illustrates an electrical quantity sensing device or protective relay that is associated with an electrical network to be protected. This electrical network may be of any type having a condition to which the sensing device is to respond. For present purposes, it will be assumed that the network is a three phase alternating current network operating at a frequency of 60 Hertz and represented by the line conductors L1, L2, and L3. These line conductors transmit an alternating current from a suitable source to a load through a circuit breaker 4 having a trip coil 6. The circuit breaker 4 further comprises a plurality of separable line contacts 8, 10 and 12 which are closed when the circuit breaker 4 is closed and which are open when the circuit breaker 4 is open. Energization of trip coil 6 while circuit breaker 4 is closed results in a tripping or opening operation of the circuit breaker. It is to be distinctly understood that while the invention is illustrated in connection with a polyphase network, it is equally applicable to a single phase network. It may be used to monitor total current in either a single phase network or total current in a polyphase network dependent upon details of the circuit which combines the output of the sensing windings of the current transformers.

In a preferred embodiment, the invention is shown as comprising a current relay which is responsive to the magnitudes of the line current flowing through the line conductors L1, L2 and L3 and will respond to the highest current magnitude flowing in the conductors L1, L2 and L3. When this current magnitude exceeds a predetermined value for a time interval depending on the current magnitude, the relay energizes the trip coil 6 to open the circuit breaker 4 in either a substantially instantaneous manner or after a predetermined time delay depending upon the current magnitude.

Figure 2:
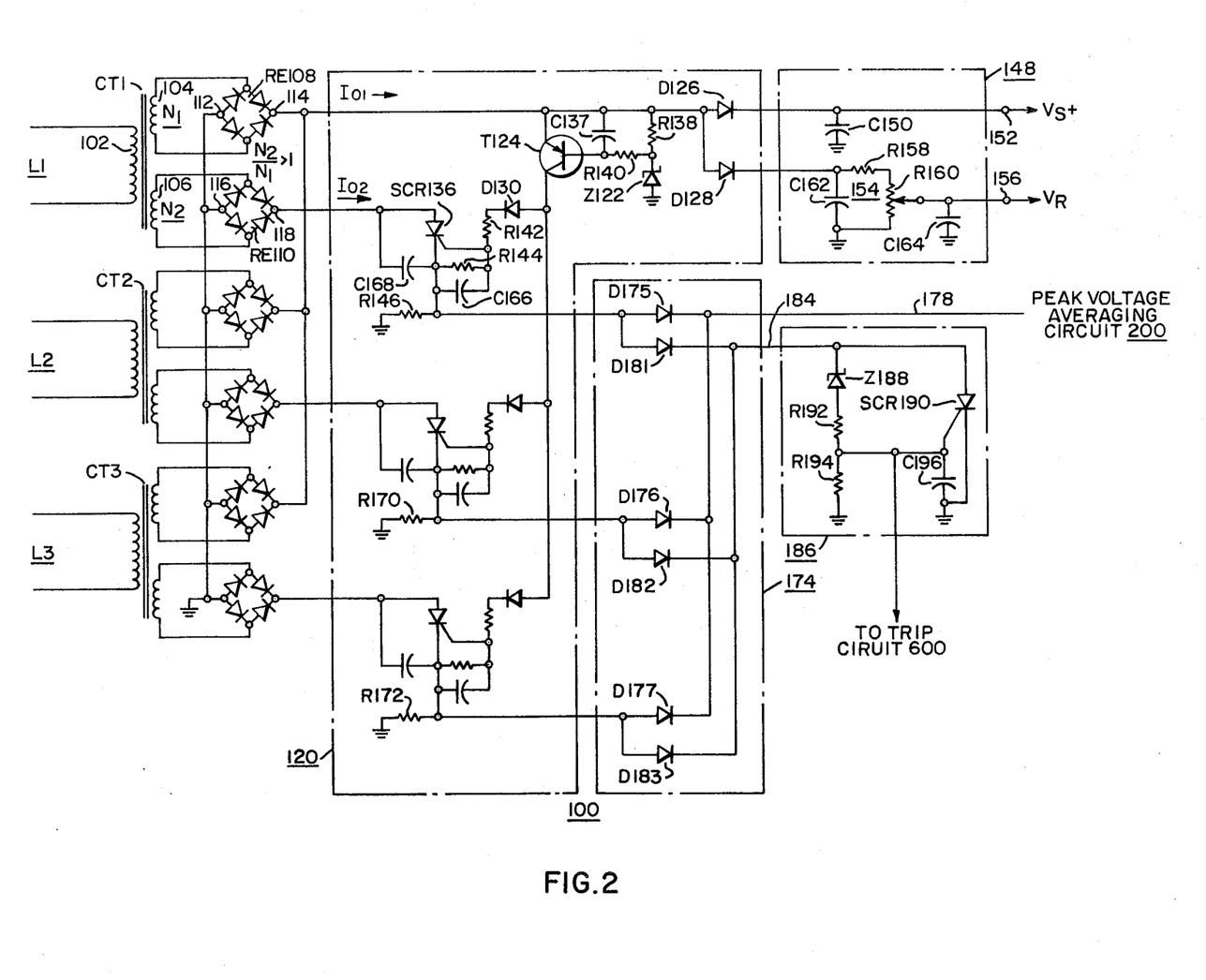
FIG. 2 is a schematic diagram illustrating the input circuit shown in block form in FIG. 1.

As illustrated in FIG. 2, an input circuit 100 comprises a plurality of substantially similar current transformers CT1, CT2 and CT3 with the primary windings of said transformers being individually energized by the line current of conductors L1, L2 and L3 respectively. Each current transformer has a first output winding 104, referred to as a power winding, and a second output winding 106, referred to as an information winding. Both output windings are interlinked by the same flux and the number of winding turns $N_1$ in each power winding is less than the number of winding turns $N_2$ in each information winding.

To facilitate explanation, only the operation of current transformer CT1 and its accompanying circuitry will be described in detail. All three transformers and their accompanying circuitry operate in a similar fashion to each provide first and second output currents, $I_{o1}$ and $I_{o2}$, which are proportional to the line current energizing the respective transformer.

The current transformer CT1 has its primary winding 102 energized in accordance with the line current in line conductor L1. The power winding 104 and information winding 106 are connected respectively to the input terminals of the full wave bridge rectifiers RE108 and RE110 having output terminals 112-114 and, 116-118 respectively. Terminals 112 and 116 are connected to a common bus which is shown as being grounded. Terminals 114 and 118 are connected to first and second input terminals of a control circuit 120.

Control circuit 120 comprises a voltage actuated device which is illustrated as being in the form of a Zener diode Z122, a first switch device T124 which is shown as a PNP transistor, a plurality of diodes D126, D128, and D130, a second switch device SCR136 which is shown as a thyristor, capacitors C137 C166 and C168 and a plurality of resistors R138, R140, R142, R144 and R146. The control circuit 120 provides the sequential operation of the power secondary winding 104 and the information secondary winding 106.

Hereinafter, the word thyristor shall be used to designate any switching device having a first or anode terminal, a second or cathode terminal and, a third or gate terminal. Once conduction begins, the device will not cease conducting unless the current flowing into the anode drops and remains below a predetermined magnitude for at least a minimum period of time which shall be designated as the minimum shutoff time.

Following each zero crossing of the line current in conductor L1, balancing of the primary ampere-turns is first achieved by the current flow $I_{01}$ through the power output winding 104. During this time, the information output winding 106 remains open circuited and ineffective due to the non-conducting or deenergized condition of the thyristor SCR136 which acts as an open switch.

The current $I_{01}$ is rectified by rectifier RE108 and is used to charge a power supply 148. A portion of current $I_{01}$ flows between the terminals 112 and 114 through a diode D126 and an energy storage device or capacitor C150 to provide a positive (with respect to ground) voltage $V_s$ at terminal 152. A second portion of the rectified current $I_{01}$ flows between the output terminals 112 and 114 through a diode D128 and an energy storage device or capacitor C162 to to provide a second power supply circuit 154 having a substantially ripple-free regulated voltage $V_R$ between ground and an output terminal 156. The second power supplying circuit 154 is used to supply power for low current drain use. The reference voltage power supplying circuit 154 is connected in parallel with capacitor C150 and comprises serially connected resistor R158 and rheostat R160 connected in shunt across the capacitor C162. The movable arm of the rheostat R160 is connected to terminal 156. A filter capacitor C164 is connected between the movable arm of rheostat R160 and ground.

When the voltage between terminal 114 and ground is below the breakover voltage $V_{Z112}$ of a temperature compensated Zener diode Z122, no substantial magnitude of current $I_{01}$ flows into the emitter of transistor T124 or through resistor R138. As the rectified current $I_{01}$ charges the capacitors C150 and C162, the voltage across the capacitors C150 and C162 increases until it approaches a magnitude equal to $V_{Z122}$ which is the regulated output voltage $V_S$. Apart from preventing the discharge of the capacitors C150 and C162, the diodes D126 and D128 provide temperature compensation for the regulated voltages since the diodes D126 and D128 tend to balance the base-emitter junction temperature effect of the transistor T124.

When the voltage level across capacitors C150 and C162 substantially reach $V_{Z122}$, the Zener diode Z122 will breakover and conduct current through resistor R138. This reduces the potential of the base of transistor T124 and base drive current will then flow causing the transistor T124 to conduct through its emitter and collector, diode D130, and resistor R142 to energize the gate of the Thyristor SCR136. In the embodiment illustrated in FIG. 2, a resistor R144 and capacitors C166 and C168 have been connected so as to prevent thyristor SCR136 from being energized by noise signals which may occur at the gate or by temperature related leakage current at the anode.

The energization of its gate causes the thyristor SCR136 to conduct and complete a path for the rectified current $I_{02}$ between the output terminals 116-118, through the anode and cathode of thyristor SCR136, resistor R146 and ground bus. This will produce a voltage across the resistor R146 having a magnitude equal to $(I_{02})(R146)$.

Since both the output windings 104 and 106 are interlinked by the same flux, the relative magnitudes of the voltages of the windings 104 and 106 must be the same as their turn ratio $N_1$ to $N_2$. After the thyristor SCR136 condusts, the terminals 116 and 118 will be substantially at that voltage which appears across the resistor R146 and the voltage level at output terminals 112 and 114 will drop from approximately $V_{Z122}$ plus the emitter to base voltage magnitude of transistor T124 to approximately $$\frac{(I_{02})(R146)(N_1)}{N_2}.$$

The values of $N_1$, $N_2$ and of the resistance of R146 and of the maximum expected value of $I_{02}$ must be selected such that the magnitude of $$\frac{(I_{02})(R146)(N_1)}{N_2}$$

for all expected magnitudes of line current in conductor L1 will never exceed $V_{Z122}$ plus the emitter to base voltage of transistor T124. A suitable, but not critical design value for the illustrated quantity sensing device is one in which the magnitude of $I_{02}$ is limited to the value corresponding to a maximum line current magnitude in conductors L1, L2 and L3 which is equal to forty times the magnitude of the minimum pickup current. Minimum pickup current is defined as the minimum magnitude of line current which produces a pickup voltage of the minimum magnitude which will actuate the pickup comparator circuit 402. Limiting means to be more clearly set out below have been included to limit the magnitude of $I_{02}$ at line currents which exceed forty times the pickup value.

When the thyristor SCR136 is energized, the magnitude of the voltage across R146 will be greater than the voltage between output terminals 112 and 114 thus back biasing the diode D130. The magnitude of the voltage between terminals 112 and 114 will drop below the voltage $V_{Z122}$ and current through the Zener diode Z122 terminates. The voltage of the terminals 112 and 114 will drop below the voltage across capacitors C150 and C162, however current will not discharge because of back biased diodes D126 and D128. Thus the conduction of the thyristor SCR136 effectively open-circuits the winding 104.

The gate of thyristor SCR136 loses control of the thyristor device once rectified current $I_{02}$ begins to flow between its anode and cathode and the thyristor SCR136 remains energized until the line current in conductor L1 experiences the next zero crossing. Upon deenergization of the thyristor SCR136, the information winding 106 is open circuited. At that time, balancing of the primary ampere-turns is achieved solely by the power winding 104 and the magnitude of the voltage at output terminals 112 and 114 jumps to a magnitude determined by the ampere-turns balance principle of the windings 102 and 104. The power winding 104 is again rendered effective to recharge the capacitors C150 and C162 as described above.

The rectified current $I_{o2}$ passing through resistor R146 when the thyristor SCR136 is energized provides a suitable information voltage regardless of whether the signal is processed in RMS, peak or average form. The voltage across resistors R170 and R172 respectively provide information voltages respectively proportional to the line currents in conductors L2 and L3.

The power supply 148 is recharged during each initial portion of each one half cycle of the line current and thereafter provides information voltages for the remaining portion of the half cycle. The length of time during each half cycle of line current in conductor L1 that power winding 104 and information winding 106 are each effective will depend on the time necessary for the voltages across capacitors C150 and C162 to recharge to a voltage magnitude equal to $V_{Z122}$. If the information voltages are to be processed in RMS or average form, the accuracy of said processed information voltages will vary inversely with the maximum charging time of capacitors C150 and C162 and the circuit components should be chosen to recharge the power supply 148 in as short a time as is expedient considering the acceptable burden on the network being monitored. For peak signal detection, it is only necessary to limit the charging time to less than 90° of the sinusoidal line current. The magnitudes of the resistors R146, R170 and R172 should be as low as is consistent with the desired sensitivity to reduce the burden. A suitable value may be 50 ohms.

The polyphase overcurrent relay of FIG. 2 responds to the highest magnitude of the line current in conductors L1, L2 and L3. An auctioneering circuit 174 provides a first auctioneered voltage signal which is responsive only to the highest magnitude of the three voltages developed across resistors R146, R170 and R172 and comprises diodes D175, D176 and D177 which are respectively connected between the undergrounded ends of the resistors R146, R170 and R172 and a common output conductor 178 which is connected to the AC-DC conversion circuit 200. The voltage across the one of the resistors R146, R170 or R172 which is greatest determines the magnitude of the voltage of the conductor 178. Two of the three diodes D175, D176 and D177 will be reverse biased or blocked.

The auctioneering circuit 174 provides a second auctioneered voltage which is similar to the first auctioneered voltage and comprises diodes D181, D182 and D813 which respectively connect the ungrounded ends of the resistors R146, R170 and R172 to a common output conductor 184 which is connected to a limiting circuit 186 whereby a second auctioneered voltage signal is supplied to the aforementioned limiting means.

The limiting circuit 186 connects the conductor 184 to ground in parallel with resistors R146, R170 and R172. A voltage regulating device Z188 shown as a Zener diode breaks over when the second auctioneered voltage has a magnitude in excess of forty times pickup current. When the device Z188 breaks over a Thyristor SCR190, having its cathode connected to the common bus at ground potential, is rendered conductive or energized. The shunt circuit 186 will thus render the whole input circuit 100 ineffective by shunting to ground substantially all of the current normally flowing through resistors R146, R170 and R172. Resistor R192 is provided to limit the current through the gate of Thyristor SCR190 when the Zener diode $Z_{188}$ is in its conducting state. Resistor R194 and capacitor C196 have been connected so as to prevent thyristor SCR190 from being energized by noise signals at the gate.

A second form of limiting means is accomplished by designing the current transformers CT1, CT2 and CT3 to saturate at a predetermined level of line current such that the maximum magnitude of the voltage between terminals 112 and 114 is limited to a value that is less than the voltage magnitude $V_{Z122}$ plus the emitter to base voltage of the transistor T124 when one or more of the windings 106 are energizing their respective loading resistors R146, R170 and R172.

Figure 3:
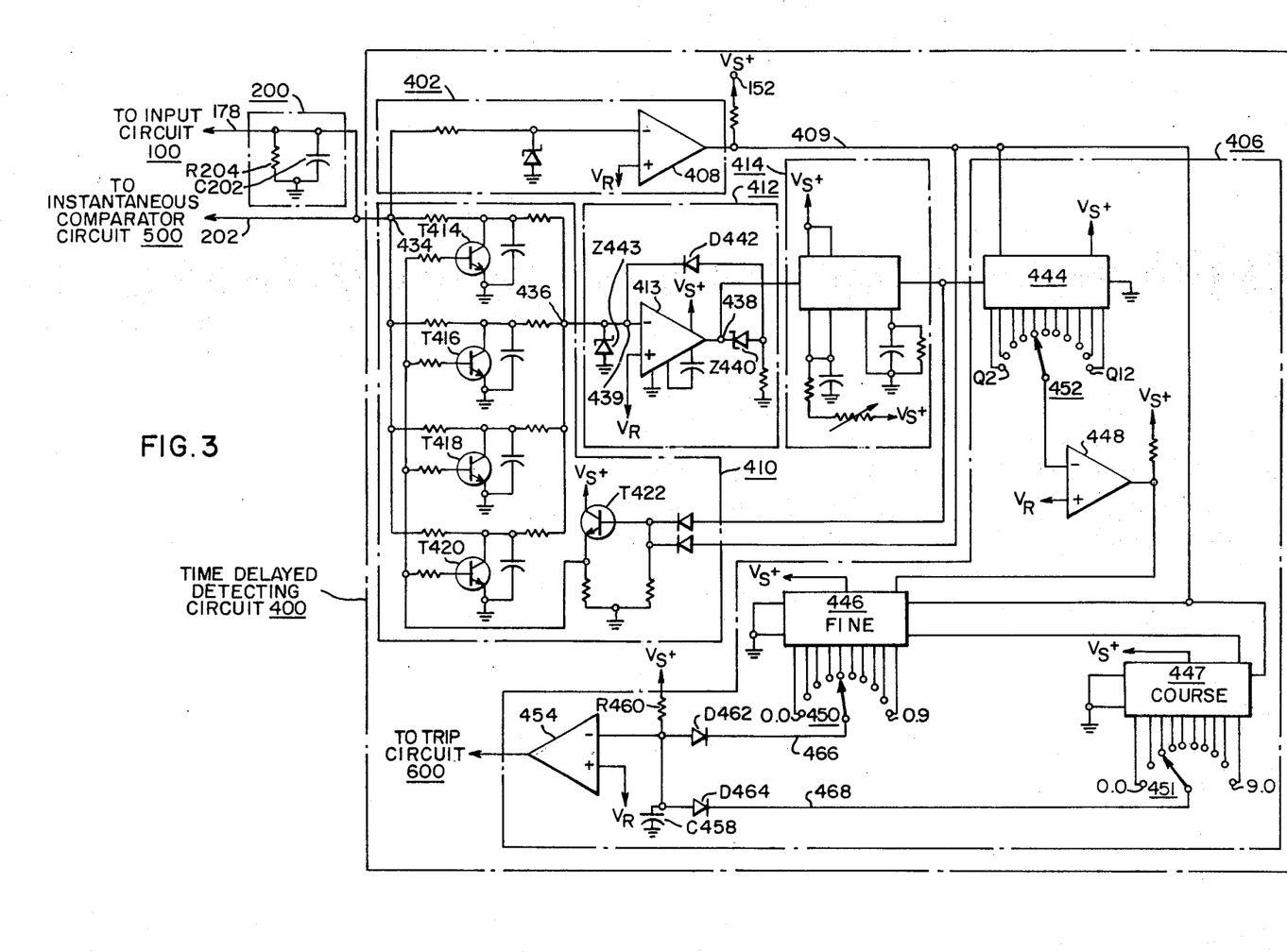
FIG. 3 is a schematic diagram illustrating the AC-DC conversion circuit and the time delay circuit shown in block form in FIG. 1.

As shown in FIG. 3, the conductor 178 supplies the first auctioneered voltage to a peak voltage averaging circuit 200 which may take any form but which is shown comprising a filter network including a filter capacitor C202 and resistor R204 connected in parallel. The circuit 200 energizes the output conductor 202 with a DC voltage whose magnitude is proportional to the averages of the peak values of the first auctioneered voltage. The conductor 202 of the averaging circuit 200 is connected to a time delayed detecting circuit 400 and to an instantaneous trip detecting circuit 500.

TIME DELAYED CIRCUIT

The time delayed circuit 400, more completely shown in FIG. 3, comprises a pickup circuit 402, a digital counting circuit 406, a resetting RC delay network 410, an interface 412 and a monostable multivibrator circuit 414. At a predetermined time interval, TD, after the magnitude of the DC voltage from conversion circuit 200 exceeds its minimum predetermined pickup value the counting circuit will supply a control signal to energize the trip circuit 600 either through the time delayed comparator circuit 400 or through the instantaneous detecting circuit 500 depending upon the magnitude of the pickup current supplying the pickup voltage signal. The length of the time delay TD provided by circuit 400 varies inversely with the magnitude of the DC pickup voltage, except that a fixed minimum time delay is provided by the time required for the multivibrator 414 to change its state. As will be more fully set out below, the time delay circuit is capable of providing an output voltage according to any desired inverse time response curve depending upon the values of R and C used in the delay network 410 and the setting of the counting circuit 406.

The pickup circuit 402 inhibits the operation of and resets the time delay circuit 400 whenever the magnitude of the pickup DC voltage from the averaging circuit 200 is less than the predetermined pickup value and will initiate the operation of the circuit 400 when the pickup voltage exceeds the minimum magnitude. The pickup circuit 402 comprises a comparator device 408 which has its negative input terminal connected to and energized by said conversion circuit 200 and which has its positve terminal connected to terminal 156 of the reference voltage circuit 154. The voltage $V_R$ determines the minimum pickup voltage and may be adjusted by the movable arm of rheostat R160. When the voltage output of the circuit 200 is less than the value $V_R$, the comparator 408 does not draw current from the supply terminal 152 and the output conductor 409 is maintained at substantially the voltage $V_S$. When the pickup voltage exceeds the value $V_R$, the comparator 408 effectively connects the conductor 409 to ground and the counters 444, 446 and 447 are conditioned to count the pulses from the multivibrator 414. A suitable pickup comparator 408 is the first unit of a monolithic quad comparator integrated circuit MC3302P which is commercially available from Motorola, Inc. Device MC3302P comprises four identical comparator units arranged in a 14 lead dual in-line plastic package. The second, third and fourth units of device MC3302P are conveniently utilized elsewhere in the circuits 400 and 500.

Shaping of the inverse time response curve is first provided by a passive network 410 having resistive and capacitive elements, the interface 412 and a monostable multivibrator or one-shot device 414. The capacitive elements are deenergized each time that output voltage at terminal 436 exceeds the voltage $V_R$. The transistors T414, T416, T418, and T420 are shunt connected across these capacitive elements and have their bases connected to the output of the multivibrator 414. Each time the multivibrator 414 is pulsed, the transistors will conduct and discharge the capacitive elements, thus permitting the network 410 to achieve cyclic operation to pulse the counters 444, 446 and 447.

There are two timing characteristics provided by the pulse generating circuit 404, the time delay, TD1, provided by the RC network 410 which is a function of the line current magnitude and the fixed time delay, TD2, of the one shot device 414.

The resetting delay network 410 comprises a plurality of parallel branches. Each branch includes capacitors such that the charge on the capacitor of each branch is charged along a different time rate which if plotted on semilog paper results in the time current relationships 426, 428, 430 and 432 shown in FIG. 4. The curve 424 shows the inverse time current relationship obtained by the network 410 when suddenly energized by the DC voltage signal which is proportional to the highest peak magnitude of the line currents flowing through conductors L1, L2, and L3. It will be appreciated that curve 424 is the sum of the time relationships 426-432. Thus the time required for the equivalent voltage response magnitude of the RC network 410 to rise from zero to a predetermined magnitude will be inversely related to the highest peak magnitude of said line currents.

Although four branches are shown in FIG. 3, any number of branches may be used. Each branch of the illustrated RC network 410 comprises two resistors serially connected between an input terminal 434 and an output terminal 436, and a capacitor parallelly connected from a point between the two resistors to ground potential.

Figure 5:
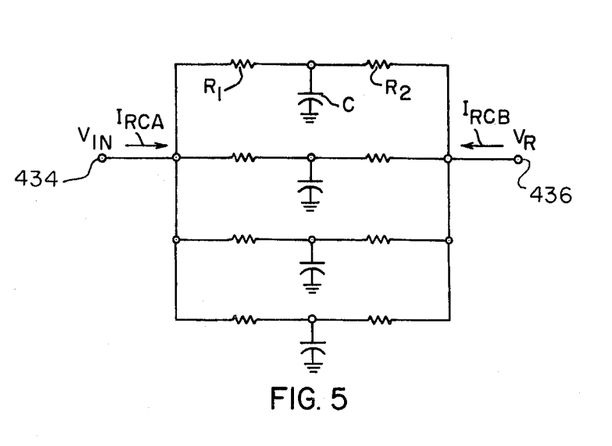
FIG. 5 is a schematic diagram useful in describing the RC network used in the time delay circuit.

FIG. 5 has been included for an analysis of the RC network 410. It will be assumed that all of the capacitive elements are initially deenergized and that the voltage $V_{IN}$ between input terminal 434 and ground suddenly increases to or above the minimum pickup magnitude.

The capacitors of the branches will charge at their individual rates. During this time the voltage $V_{IN}$ will be determined by the magnitude of the fault current (which will be assumed to be of fixed magnitude during a given fault) causing a charging current $I_{RCA}$ to flow to the capacitors. A voltage $V_R$ will be maintained at the terminal 436 of the conversion circuit 200. It will be appreciated that the amplifier 413 will attempt to maintain the potential $V_R$ at its input terminal 439. A second component of charging current $I_{RCB}$ flows to the network 410 from the output terminal 438 through the Zener diode Z440 and diode D442. When the capacitors of the network 410 reach their critical charge the current component $I_{RCB}$ will be zero. However since the voltae at the terminal 434 will of necessity be greater, current will continue to flow to charge the capacitors and the voltage at terminal 436 will rise sufficiently to cause the operational amplifier 413 to reduce the voltage at its output terminal 438 in an endeavor to maintain the voltage magnitude $V_R$ at its negative input terminal and consequently the voltage magnitude at terminal 436.

Identifying the voltage at terminal 434 as $V_{IN}$, the voltage at the terminal 436 as $V_R$, the voltage at the ungrounded terminal of the capacitor as $V_C$, the resistance of the resistor between the capacitor and terminal 434 as $R_{17}$ and the resistance of the resistor between the capacitor and the terminal 436 as $R_2$, the magnitude of the current flow to the capacitor from the terminal 436 as $I_{RCB}$, and using the direction of current flow to the capacitor from the terminals 434 and 436, the following mathematical formula for $I_{RCB}$ in terms of time t may be derived either by calculus directly or with the use of LaPlace transforms.

$$I_{RCB} = \frac{V_R}{R_1 + R_2}\left[1 + \frac{R_1}{R_2}\left(e^{-\frac{R_1+R_2 t}{R_1 R_2 C}}\right)\right] - \frac{V_{IN}}{R_1 + R_2}\left[1 - e^{-\frac{(R_1+R_2) t}{R_1 R_2 C}}\right]$$

By adding together the $I_{RCB}$ for each of the RC branches and equating the sum to zero, the time t at which the network 410 will actuate the operational amplifier 413 of the interface 412 may be determined.

The purpose of the Zener Diode Z440 is to raise the voltage at the output terminal 438 of the operational amplifier 413 sufficiently above the voltage $V_R$ to prevent the operation of the monostable vibrator 414 during the charging period of the network 410.

When the amplifier 413 responds to network 410 the potential of the terminal 438 thereof will almost instantaneously decrease in magnitude to provide an operating signal to actuate the monostable multivibrator 414 which, at the expiration of its fixed time interval, will supply a positive pulse to the counter 444 and to the transistor T422. When transistor T422 conducts it causes the transistors T414, T416, T418 and T420 to conduct and discharge the capacitors of the network 410. When the capacitors discharge, the potential of the negative input terminal 439 falls to and is maintained at the voltage magnitude $V_R$. At the end of the time delay interval TD2 of the multivibrator 414 it will again revert to its low output condition causing the transistors T414-T422 to cease conducting and the network 410 will repeat its timing operation.

The monostable multivibrator 414 also provides its positive going pulse to the counting circuit 406, which in turn provides an output voltage signal upon receipt of a predetermined number of one-shot pulse signals. The NE/SE 555 monolithic timing circuit provides a suitable monostable multivibrator 414 and is commercially available from the Signetics Corporation.

As illustrated in FIG. 3, the counting circuit 406 comprises counters 444, 446 and 447, and comparator means 448 for cascading the three counter circuits in proper sequence. A large number of counts obtained with a network 410 having a relatively low RC time constant is desired for greater accuracy. A suitable RC time constant range for the network 410 is 0.5M.S. to 5M.S and a suitable counting range for the counter 444 is from 500 to 4,000. This relationship determines the time scale reference. A binary counter 444 is particularly desirable and a suitable counter is the RCA binary counter/divider CD4040AE which advances on the negative transition of the one-shot pulse and is commercially available from the RCA Corporation. The second comparator unit 448 of the previously described comparator device MC3302P (a first unit of which was used for the comparator 408) has its negative input terminal connected through a selector switch 452 and its output connected to the count input terminal of the decade counter 446. The binary counter 444 is arranged to provide an output pulse for each desired number of operations of the multivibrator. The desired number is different for each of the terminals of the switch 452. The counter 444 is reset to its initial or starting condition by the positive signal received from the comparator 408 and is released to count when the output signal of the comparator 408 decreases.

The counters 446 and 447 may take the form of decade counters whereby the number of output pulses from the binary counter 444 required to actuate the trip circuit may be selected. These counters 446 and 447 collectively select the one of a family of time curves which controls the actuation of the trip circuit 600.

The ten position selector switches 450 and 451 are respectively connected to said decade counters 446 and 447 such that one hundred different time curves based on the time scale reference curve may be obtained for precision selection. When the counters 446 and 447 each provide a positive output pulse at their respective selector switches 450 and 451, both of the diodes D462 and D464 will be back biased to actuate the comparator 454, may be the third unit of device MC3302P having the comparators 408 and 448. The decade counters may be of the type supplied to the trade by RCA Corporation as CD4017AE.

Figure 4:
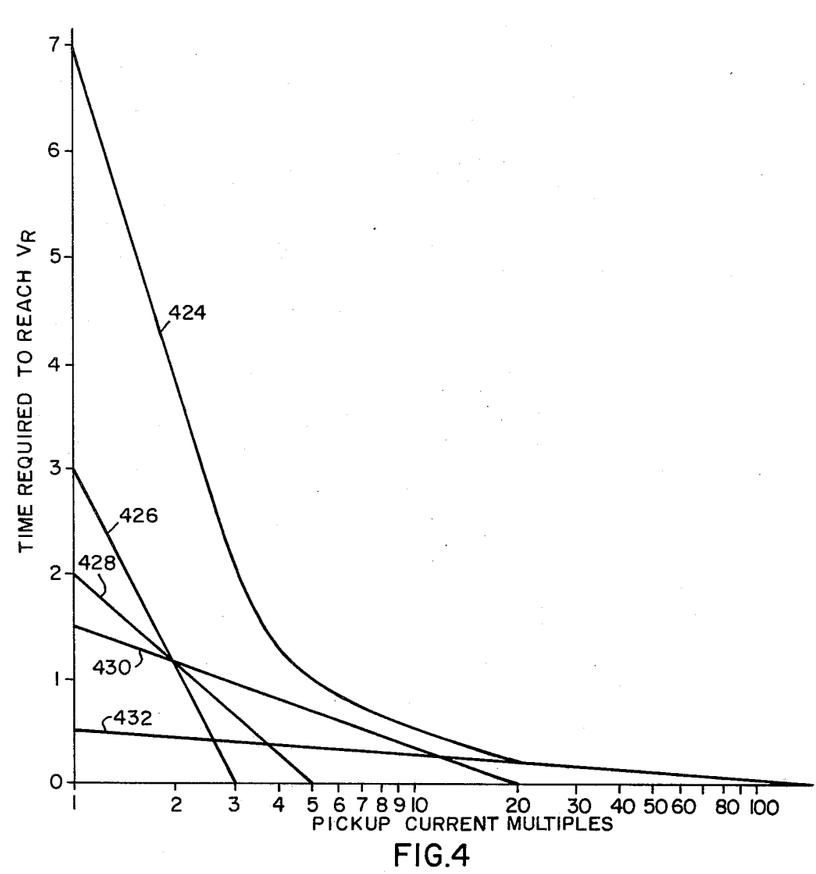
FIG. 4 is a semilog plot showing the manner in which curve shaping of a desired inverse time response curve is achieved using a superposition technique.

The time-current relationships 426-432 may be chosen to provide a trip curve 424 having an almost unlimited number of shapes to duplicate any existing inverse time current curve of the more conventional electro-mechanical over current relays such as the CO relays presently manufactured and sold by Westinghouse Electric Corporation. The values of the required resistors and capacitors may be obtained by determining a number of time-current relationships on the curve to be duplicated and simultaneously solving the time-current relationships for each of the RC branches of the network 410 in accordance with the $I_{RCB}$ formula set forth above.

INSTANTANEOUS COMPARATOR CIRCUIT

Figure 6:
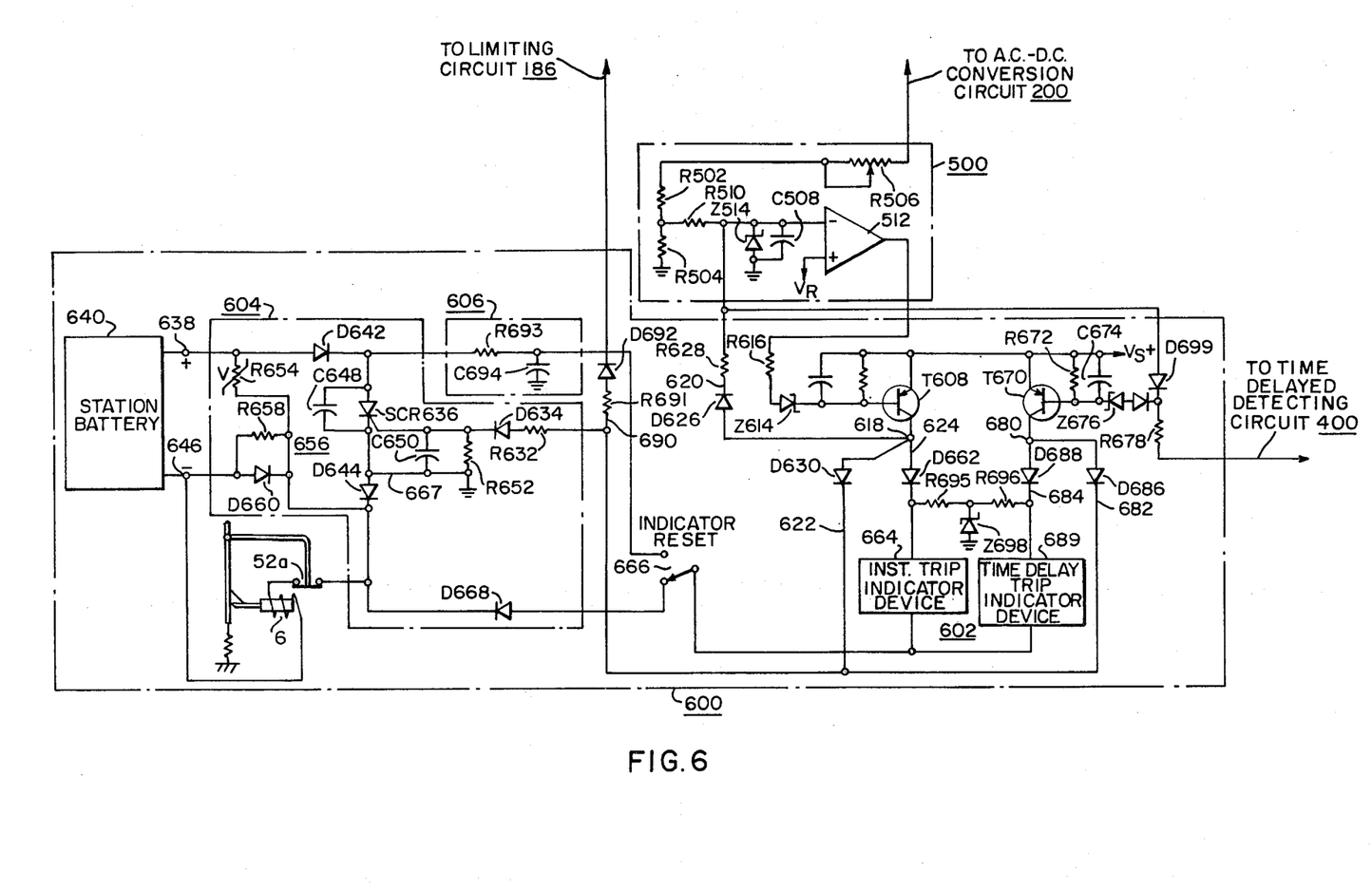
FIG. 6 is a schematic diagram illustrating the instantaneous comparator circuit and the trip circuit shown in block form in FIG. 1.

The instantaneous detecting circuit 500 provides an output voltage signal for tripping the breaker 4 immediately after the magnitude of the current in any of the lines L1, L2 or L3 and consequently the DC voltage from conversion circuit 200 exceeds a predetermined value.

As shown in FIG. 6, the instantaneous comparator circuit 500 consists of voltage dividing resistors R502, R504, a rheostat R506, a filter capacitor C508, a resistor R510, a comparator 512 (which may be the fourth unit of device MC3302P), and an overvoltage protection Zener diode Z514. When the level of the voltage across capacitor C508 reaches a magnitude equal to that of $V_R$, the output of comparator 512 will provide a negative going signal to said trip circuit 600. The movable arm of rheostat R506 adjusts the magnitude of the DC voltage from conversion circuit 200 which is required to actuate the instantaneous comparator circuit 500.

TRIP CIRCUIT

A suitable trip circuit 600 for energizing the breaker trip coil 6 in response to the negative going output signals from either the time delay circuit 400 or the instantaneous trip comparator circuit 500 is illustrated in FIG. 6. Trip circuit 600 comprises an indicating circuit 602, a breaker actuating circuit 604, and an indicator reset circuit 606.

A voltage drop at the output of the instantaneous detecting circuit 500 causes base drive current to flow through a PNP transistor T608, a Zener diode Z614, a resistor R616 and the comparator 512. The flow of this base current causes the transistor T608 to raise the potential of junction 618 to substantially that of $V_{S+}$. Current then flows through three separate conductors 620, 622 and 624.

The current in conductor 620 flows through a diode D626, resistor R628 and the comparator 512 to ground. This feedback loop keeps the comparator 512 energized until the line current in conductors L1, L2 and L3 is interrupted by the breaker 4.

The current in conductor 622 flows through diode D630 and the breaker activating circuit 604 where it flows through a resistor R632, a diode D634 and into the gate of a thyristor SCR636. The energized thyristor SCR636 when conducting completes a path for current flow between the positive terminal 638 of a station battery 640 through diode D642, the thyristor SCR636, diode D644, the 52a normally closed contacts of the breaker 4, the trip coil 6 and the negative terminal 646 of battery 640. The trip coil 6 when energized trips breaker 4. Capacitors C648 and C650 and resistor R652 are provided to prevent thyristor SCR636 from energization by noise or leakage currents. The 52a contacts are located on the breaker 4 and are open circuited when the breaker 4 trips, thus interrupting current through the coil 6 and the thyristor SCR636.

The breaker actuating circuit 604 further comprises a resistor R654 having a negative voltage-resistance characteristic to absorb transient energy signals at terminal 638 of battery 640, and also a discharge circuit 656 comprising resistor R658 and diode D660 for discharging the inductive energy stored in trip coil 6 should it not have dissipated when the breaker 4 is reclosed.

The indicating circuit 602 will indicate only after the thyristor SCR636 has been energized. Indication of an instantaneous trip is provided by the flow of current in conductor 624 through diode D662, an electrically resettable indicating device 664, a two position switch 666 having an indicating device reset position and a set position, diodes D668, coil 6, battery 640, diode D642, thyristor SCR636, and the common bus 667 connected to ground.

The indicating device 664 is shown as a light reflecting electromagnetic status indicator having an inherent memory whereby it will maintain its indicating status even though its energizing current is intensified by the opening of the contacts 52a. The device 664, when once actuated, will continue to indicate until the indicator device is reset. A suitable indicator device 664 is commercially available from Ferranti-Packard Ltd.

The operation of trip circuit 600 in response to the negative going signal from the time delay circuit 400 is substantially similar. A voltage drop at the output of comparator 454 causes base drive current to flow through an PNP transistor T670, a resistor R678 and Zener diode Z676. The base current causes the transistor to conduct current through transistor T670 to raise the potential of junction 680 to substantially that of $V_S+$. Current then flows through conductors 682 and 684.

The current of conductor 682 flows through diode D686, the conductor 622, resistor R632, diode 634 and causes the thyristor SCR636 to conduct and energize the trip coil 6 in the manner previously described. The current in conductor 684 flows between $V_S+$ and ground bus 667 through diode D688, an electrically resettable indicating device 689, the selector switch 666, the diode D668, contacts 52a, coil 6, battery 640, diode 642, and thyristor SCR636. Indicating device 689 is substantially similar to device 664 and when once actuated will remain actuated until reset.

The Zener diodes Z614 and Z676 have been included to prevent an undesired tripping of breaker 4 during the initial period of relay operation when the voltage at terminal 152 of the power supply circuit 148 and ground has not yet reached its normal operating value $V_S+$. The breakover voltage magnitudes of Zener diode Z614 and Z676 should be high enough to prevent current flow during this period.

A conductor 690 is connected to the conductor 682 such that the limiting circuit 186 and the breaker actuating thyristor SCR636 are concurrently energized. The limiting circuit 186 prevents high voltage failure of circuit components during the period before the line current is interrupted by the opening of breaker contacts 8, 10 and 12. Current flows between terminal 680 and ground through diode D686, conductor 682, conductor 690, a resistor R691, a diode D692 and the gate of the thyristor SCR190. When thyristor SCR190 conducts, it connects the conductor 184 to ground, thus shunting the load resistors R146, R170, R172.

A reset circuit 606 for resetting the devices 664 and 689 comprises a resistor R693 and a capacitor C694 which is energized from battery 640. When switch 666 is in its reset position, the capacitor C694 discharges through the indicating devices 664 and 689, resistors R695 and R696, a Zener diode Z698 and the common bus connected to ground potential. The Zener diode Z698 has a breakover voltage level high enough to prevent conduction through to the common bus except during reset operation of the trip circuit 600.

It is conceivable that the DC voltage signal from conversion circuit 200 will continue to rise after it activates the time delay circuit 400 until it reaches a magnitude sufficient to also activate the instantaneous comparator circuit 500. To prevent this from occurring, a diode D699 is connected between the negative input terminal of the comparator 512 and the common connection of the resistor R678 and Zener diode Z676. When the time delayed detecting circuit comparator 454 provides its negative going signal, the cathode of the diode D699 goes to a potential which is sufficiently low enough to prevent the operation of the comparator 512 of the instantaneous detecting circuit 500. Consequently, the transistor T608 is cut off and the energization of the instantaneous trip indicator device 664 is prevented. Thus the indicating circuit 602 is capable of indicating which of the detecting circuits 400 or 500 initially actuated the tripping circuit 600.

Figure 7:
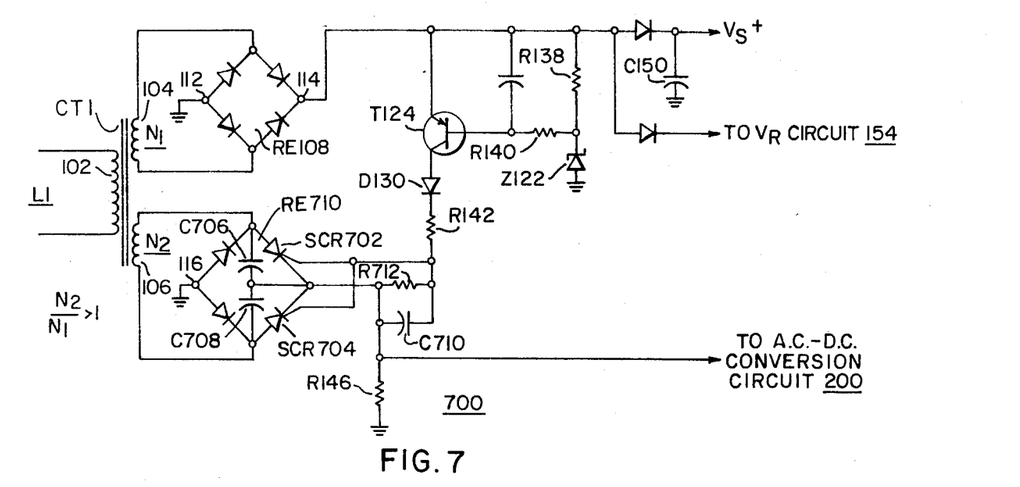
FIG. 7 is a schematic diagram illustrating a modified form of the input circuit illustrated in FIG. 2.

FIG. 7 illustrates an input circuit 700 which is a modified form of the input circuit 100 of FIG. 2. To simplify the explanation, only the apparatus associated with phase transformer CT1 is shown, as the phase transformers CT2 and CT3 and their accompanying circuitry would be similar. The thyristor SCR136 and its accompanying circuitry, and two diodes of the rectifier bridge RE110 have been replaced with thyristors SCR702 and SCR704 and accompanying circuitry comprising capacitors C706, C708 and C710 and resistor R712.

The modified input circuit 700 assures that the information winding 106 of transformer CT1 will be rendered ineffective after each zero crossing of the line current in conductor L1. As previously explained, the thyristor SCR136 shown in FIG. 2 is designed to turn off when the rectified current at its anode drops to and remains below a predetermined magnitude for at least a minimum shutoff time. If the first derivative of the anode current magnitude with respect to time is such that the current does not remain below said predetermined level for the minimum shutoff time, the thyristor SCR136 will never be deenergized. If, however, a pair of thyristors SCR702 and SCR704 are substituted for the pair of the rectifiers in the bridge circuit RE110, as illustrated in the bridge circuit RE710 each receives an alternating potential at its anode. When energized the thyristor SCR702 provides a path for current between the information winding 106 and the common bus connected to ground potential through the thyristor SCR702 and the resistor R146 when the upper terminal of the bridge RE710 is positive. Similarly, when energized the thyristor SCR704 provides a path for current between the information winding 106 and the ground bus through the thyristor SCR704 and the resistor R146. The operation of the input circuit 700 is in other respects similar to the input circuit 100 of FIG. 1 and its operation will be apparent from the description thereof.

Figure 8:
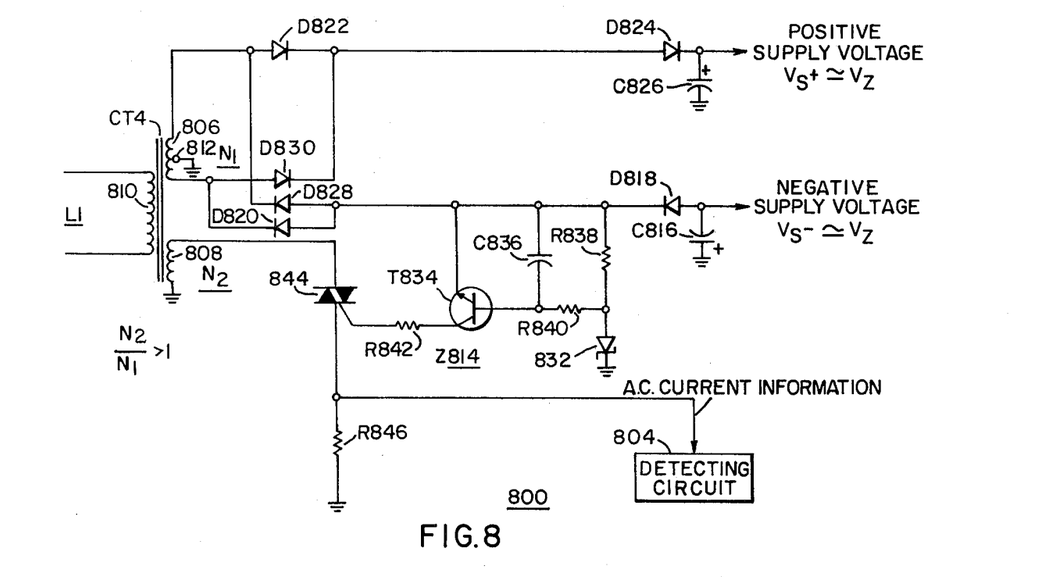
FIG. 8 is a schematic diagram illustrating another modified form of the input circuit illustrated in FIG. 2; and, FIG. 9 is a schematic diagram illustrating an input overvoltage protection circuit and power supply using a transformer having a single secondary winding.

FIG. 8 illustrates an input circuit 800, which is a modified form of the input circuit 100. The input circuit 800 comprises a dual regulated power supply circuit for providing positive and negative regulated supply voltages to a detecting circuit 804 requiring said voltages. The input circuit 800 further provides an AC information signal which is unrectified and responsive to the line current through conductors L1, L2 and L3. For simplification and explanation only one phase of the three phase design has been shown and will be described.

The current transformer CT4 has a power secondary winding 806, an information secondary winding 808 and a primary winding 810. The primary winding 810 is energized in accordance with the line current in conductor L1. The number of winding turns $N_2$ of the information winding 808 is greater than the number of winding turns $N_1$ of the power winding 806. A center tap 812 on the power winding 806 is connected to the common bus.

For simplification, it is assumed that the line current in conductor L1 has just experienced a zero crossing, the power winding 806 is effective and the information winding 808 is non-conducting. With line current flowing in conductor L1 in a direction to make the upper terminal of the winding 806 positive with respect to the lower terminal (which will be hereinafter referred to as the "positive half cycle"), current to charge the capacitor C816 will flow between the grounded terminal of capacitor C816 and the grounded center tap 812 of the winding 806 through the capacitor C816, diodes D818 and D820, and the lower half of the power winding 806. Current for charging the capacitor C826 will flow between the grounded terminal of winding 806 and capacitor C826 through the upper half of the winding 806, the diodes D822 and D824, and the capacitor C826. During the opposite or "negative" half cycle of the line current in conductor L1 current will charge the capacitors C816 and C824 from the power winding 806 through the diodes D828 and and D830 in place of the diodes D820 and D822. Stated otherwise, during the "positive" half cycle the capacitor C816 is charged from the lower half of the winding 806 and the capacitor C826 is charged from the upper half of the winding 806. During the "negative" half cycle the capacitor-winding relationship is reversed. The current flowing in the two halves of the winding 806 may or may not be equal since it is merely necessary that the total ampere-turns in winding 806 equal the total ampere-turns in winding 810, and the division of the current between the two halves is dictated solely by the charged condition of the capacitors C816 and C826.

A control circuit 814 is provided for regulating said supply voltages and for controlling the sequential operation of secondary windings 806 and 808. The control circuit 814 comprises a voltage regulating device Z832, such as a Zener diode, a switch device T834 such as a NPN transistor, a capacitor C836, resistors R838, R840, and R842, and a triac device 844. The term triac as used herein designates any switching device having a first or anode terminal, a second or cathode terminal, a third or gate terminal and the following properties. Current flowing from the gate permits the device to conduct current in either direction between the anode and cathode terminals. Once conduction begins, the device will not deenergize unless the current flowing between the anode and cathode drops and remains below a predetermined magnitude for at least a minimum period of time.

As the capacitors C816 and C826 charge, as above described, they will eventually both reach a predetermined magnitude equal to the breakover voltage magnitude of the Zener diode Z832. When this occurs current will flow through the Zener diode Z832, resistor R840 and the base of the transistor T834. The transistor T834 will conduct and current will flow through the gate of the triac device 844, the resistor R842, the transistor T834, diode D820, or D822, and one half of the power winding 806. The conduction of transistor T834 can occur in either the "positive" or "negative" half cycle of the transformer.

The diodes D818 and D824 provide temperature compensation of the transistor T834 and thus further regulate the voltage across capacitors C816 and C826. Diode D818 provides isolation for the capacitor C816 from leakage current of the transistor T834 or Zener diode Z832.

The energized triac device 844 when conducting renders the information winding 808 effective by providing a path for current through the information winding 808, the triac 844 and a loading resistor R846. This in turn induces a drop in the voltage across the power winding 806 and effectively terminates the flow of current therethrough in the manner set forth above in connection with the description of FIG. 2. The major difference between the form of FIG. 2 and FIG. 8 is that the voltage across the loading resistor R846 provides an electrical quantity responsive to the line current in conductor L1 which is alternating in polarity.

The triac device 844 deenergizes each half cycle of the line current similarly to the thyristor SCR136 of FIG. 2 thus rendering the information winding 808 ineffective and open circuited and rendering the power winding 806 effective to recharge the capacitors C816 and C826 each half cycle.

SATURABLE CURRENT TRANSFORMER OPERATION

Figure 9:
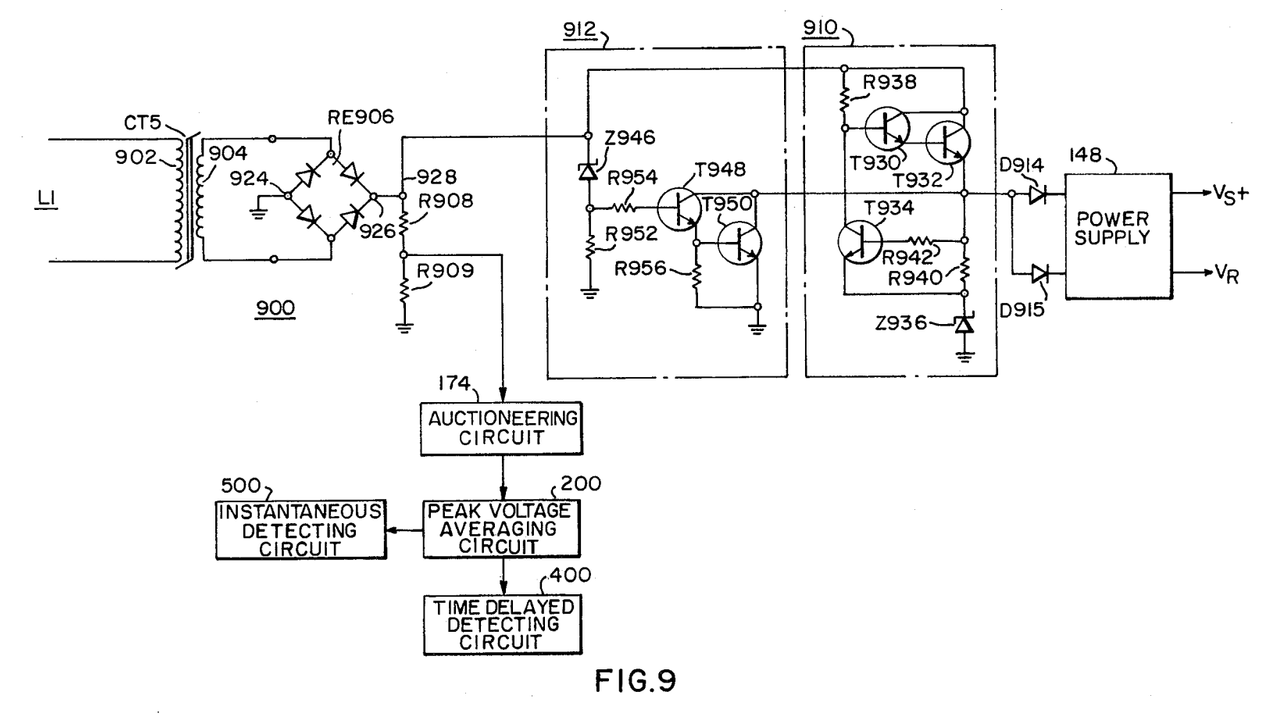

FIG. 9 illustrates a form of the invention in which an input circuit 900 utilizes a current transformer CT5 having a single secondary winding. As illustrated, the winding-core relationship of the transformer CT5 is such that the core will saturate within the expected range of network current magnitudes. Again, for purposes of simplifying the explanation the invention is shown as energized by only one phase of the input circuit.

The saturable current transformer CT5 has a primary winding 902 energized by a quantity proportional to the current in conductor L1, and a secondary winding 904. The secondary winding energizes series connected resistors R908 and R909 through a full wave rectifier RE906. A power supply 148 is connected through a regulator circuit 910 and an input overvoltage protection circuit 912 to one output of the rectifier RE906 in shunt with the resistors R908 and R909. Diodes D914 and D915 prevent any power flow back from the power supply circuit 148. The transformer CT5 is designed to saturate at a current corresponding to twice the magnitude of network current (2PU), or any desired level.

For simplicity of explanation, it will be assumed that the line current in conductor L1 has just experienced a zero crossing and that the energy storage devices C150 and C164 of the power supply 148 are initially deenergized. The energization of the primary winding 902 causes current to flow in the secondary winding 904 which is rectified by the full wave rectifier RE906. The output terminals 924 and 926 of the rectifier RE906 are connected between the ground bus and a conductor 928.

Initially (with capacitors C150 and C164 discharged) the impedance of the power supply 148 will be less than the total impedance of the resistors R908 and R909 and substantially all of the rectified secondary current flows from terminal 926 through the conductor 928 to the power supply 148. At magnitudes of line current below 2 PU current will flow for one or more cycles to charge the power supply 148. The number of cycles which are required will depend on the magnitude of the line current and the capacity of the capacitors C150 and C164. Eventually the voltage across the capacitors (and across the series connected resistors R908 and R909) will reach the desired value to provide the $V_S+$ and $V_R$ outputs. When this occurs the regulator circuit 910 will be actuated to cause current to flow between conductor 928 and ground bus through the resistor R940 and Zener diode Z936.

The regulator circuit 910 includes NPN transistors T930, T932, and T934, the voltage regulating Zener diode Z936 and resistors R938, R940 and R942. Initially, the transistor T930 conducts to supply base current to transistor T932 whereby it maintains a low impedance connection between conductor 928 and the power supply 148 for the flow of charging current above discussed. Staging the transistors as shown permits a large flow of current through transistor T932 in response to a small magnitude of current flowing into the base of transistor T930. When the magnitude of the voltage of the power supply 148 reaches its desired value the potential of the conductor 928 will be high enough for Zener diode Z936 to breakover and conduct current through resistor R940. This results in the flow of base current in transistor T934 causing it to conduct.

When the transistor T934 conducts and lowers the potential of the base of the transistor T930, this reduces the conduction of the transistor T932, and an equilibrium condition is reached such that the current through the transistor T932 drops to a magnitude required to maintain the desired voltage magnitude of the power supply 148 as determined by the Zener diode Z936.

If the drain on the power supply 148 is low in comparison with the current supplied by the transformer CT5, the major current flow is through the burden resistors R908 and R909. The resistors R908 and R909 provide a voltage dividing circuit and the relative magnitudes thereof depend upon the relative magnitudes of the voltage of the power supply 148 and the desired output voltage range of the peak voltage averaging circuit 200. The voltage across the resistor R909 provides the information signal to the auctioneering circuit 174 for providing an information signal to the peak voltage averaging circuit 200 that is responsive to the magnitude of the highest line current in any one of the conductors L1, L2 and L3.

The Zener diode Z936 is a temperature compensated device and regulates the voltage of the power supply 148. This occurs because the diodes D914 and D915 tend to cancel the temperature effect of the transistor T938 base-emitter junction.

The input overvoltage protection circuit 912 prevents the breakdown of circuit components due to excessive voltages caused by high fault currents. The protection circuit 912 comprises a Zener diode Z946, NPN transistors T948 and T950, and resistors R952 and R954 and R956. Transistors T948 and T950 connect the conductor 928 to the ground bus when the Zener diode Z946 conducts. A suitable magnitude for the Zener breakover voltage $V_{Z946}$ may be 200 volts.

The use of saturating current transformers which are saturated substantially throughout their normal operating range reduces the burden on the current transformer while at the same time enabling an inverse time current response at current input ranges well above the saturating current magnitude. In this regard it should be remembered that as the magnitude of the input current to the transformer increases the saturating current value is reached in a shorter time period. Since the magnitude of the current pulse in the secondary winding is dependent upon the rate of change of the transformer core flux (input current) an increasing peak value of the voltage across the loading resistor will occur as the input magnitude current increases. In the range below saturation this will be a straight line relationship and, of course, secondary current will follow the primary current throughout each half-cycle. As the magnitude of the input current increases beyond the core saturation value the current will flow at an increasing rate to follow the increasing rate of the input current but will only flow for a portion of each half cycle and of course the burden on the primary line conductor is greatly if not completely reduced during the time periods when no current is flowing in the secondary winding.

The operation of the current transformers in the saturating range provides a constant RMS current output and therefore such an arrangement utilizes the peak value magnitudes to sense the input current magnitudes in the saturating range.

While the use of saturating current transformers has been discussed in connection with the apparatus of FIG. 9, it may also be used with the double secondary winding construction in which the windings are used in sequence each half cycle. When used with the two secondary winding construction, the transformer should saturate only during the time periods that the magnitude sensing winding is being utilized.

What is claimed and is desired to be secured by United States Letters Patent is as follows:

1. An electrical quantity responding device comprising;
   a current transformer,
   said current transformer including a primary winding adapted to be energized by an alternating current, and first and second output windings,
   power supply means responsive to said first output winding,
   current sensing means responsive to said second output winding,
   and control means controlling said first and second output windings to achieve substantially complete balancing of the ampere turns of the primary winding in a selected one of said first and second output windings, and then in the other, within the same half cycle of the alternating current.

2. The electrical quantity responding device of claim 1 including first and second rectifier means for providing unidirectional signals for the power supply means and for the current sensing means, responsive to the outputs of the first and second output windings, respectively.

3. The electrical quantity responding device of claim 1 wherein the control means includes switching means switchable between conductive and nonconductive states, said switching means being connected to activate and deactivate the second output winding in response to the conductive state of the switching means, and means for controlling the conductive state of said switching means.

4. The electrical quantity responding device of claim 1 wherein the control means includes regulator means for regulating the power supply means, switching means switchable between conductive and nonconductive states, said switching means being connected to activate and deactivate the second output winding in response to the conductive state of the switching means, and means responsive to said regulator means for controlling the conductive state of said switching means.

5. An electrical quantity responding device comprising:
   a current transformer,
   said current transformer including an input winding adapted to be energized by an alternating current, and first and second output windings providing first and second electrical quantities, respectively, rectifying means rectifying said first electrical quantity, energy storage means adapted to be energized by said rectified first electrical quantity, a detecting circuit for providing an output electrical quantity when the magnitude of said second electrical quantity exceeds a predetermined value, and control means controlling said first and second output windings to provide their first and second electrical quantities during different portions of the same half cycle of the alternating current, such that the energy storage means provides no load on the current transformer when the second output winding is providing its second electrical quantity to said detecting circuit.

6. The electrical quantity responding device of claim 5 wherein the first and second output windings are interlinked by the same flux path, said first output winding having $N_1$ turns and when effective providing said first electrical quantity, said second output winding having $N_2$ turns which exceeds $N_1$ turns, and when effective providing said second electrical quantity.

7. The electrical quantity responding device of claim 5 wherein the control means comprises first and second switching means switchable between conductive and non-conductive states, said second switching means being connected to the second output winding, said second switching means changing to its non-conductive state at the end of each half cycle of the alternating current, to render said second output winding ineffective and said first output winding effective at the start of each half cycle of the alternating current, said first switching means being connected to the first output winding and to the second switching means, said first switching means changing from its non-conductive state to its conductive state during each half cycle of the alternating current which causes said second switching means to switch to its conductive state, said second switching means, upon switching to its conductive state, rendering the second output winding effective and the first input winding ineffective.

8. The electrical quantity responding device of claim 7 including impedance means connected to be responsive to said second electrical quantity when the second switching means is conductive, and semiconductive means connected to limit the maximum voltage magnitude across said energy storage means to substantially a predetermined value and to operate the first switching means when said predetermined maximum voltage magnitude across said storage device is reached, to cause the first switching means to switch to its conductive state.

9. The electrical quantity responding device of claim 8 wherein the impedance means is a resistor connected such that the second output electrical quantity provides a voltage across said resistor when said second output winding means is rendered effective.

10. The electrical quantity responding device of claim 9 wherein the voltage applied to the energy storage means in response to the first electrical quantity drops below the predetermined value of the energy storage means when the second output winding becomes effective, and including unidirectional means connected between the first output winding and the energy storage means which effectively disconnects the energy storage means from the first output winding to render it ineffective, when the voltage of the energy storage means exceeds the voltage applied thereto in response to the first electrical quantity.

11. The electrical quantity responding device of claim 9 wherein said resistor has a magnitude such that for all expected magnitudes of the alternating current in the input winding of the transformer, the ratio of the turns in the first output winding to the turns in the second output winding multiplied by the magnitude of the voltage across said resistor provides a magnitude less than the magnitude of the predetermined maximum voltage across the energy storage means.

12. The electrical quantity responding device of claim 10 wherein the second switching means is a thyristor.

13. The electrical quantity responding device of claim 10 wherein said second switching means comprises means for deenergizing said switch device when the magnitude of said second electrical quantity falls below a predetermined value.

14. The electrical quantity responding device of claim 10 wherein the semiconductive means comprises at least one Zener diode.

15. An electrical quantity responding device, comprising:

a current transformer, said current transformer having an input winding adapted for energization by an alternating current, and first and second output windings providing first and second electrical quantities, respectively, energy storage means, said energy storage means including first and second capacitors, diode mean interconnecting said first and second capacitors with said first output winding such that said first capacitor provides a negative regulated voltage supply, and said second capacitor provides a positive regulated voltage supply, detector means providing an output electrical quantity when the magnitude of said second electrical quantity exceeds a predetermined value, and control means controlling said first and second output windings to provide their first and second electrical quantities during different portions of a half cycle of the alternating current, such that said energy storage means provides no load on said current transformer when the second output winding is providing its second electrical quantity to said detector means.

16. An electrical quantity responding device comprising:

a current transformer, said current transformer including an input winding adapted to be energized from an alternating current network, and a first and second output winding means that are interlinked by the same flux path, said first output winding means when effective providing a first output current and having a fewer number of winding turns $N_1$ than the number of winding turns $N_2$ in said second output winding means, said second output winding means when effective providing a second output current having a magnitude proportional to the magnitude of the current in said alternating current network, control means controlling said first and second output winding means when that substantial magnitudes of said first and second output currents are provided by said output winding means in a sequential manner, an energy storage device to be energized by said first output current, a detecting circuit providing an output electrical quantity when the magnitude of said second output current exceeds a predetermined value, and limiting means for desensitizing said electrical quantity responding device when the magnitude of said current in said alternating current network exceeds a predetermined value.

17. The electrical quantity responding device of claim 16 wherein the detector circuit includes a resistor, and wherein the limiting means comprises a shunt circuit for shunting the second output current from said resistor when the current in the alternating current network exceeds the predetermined value of the limiting means.

18. The electrical quantity responding device of claim 17 wherein the shunt circuit comprises a voltage responsive switch device and means connecting said switch device in parallel with said resistor such that when the voltage across the resistor exceeds a predetermined magnitude, the second output current will be shunted from the resistor and through said switch device.

19. The electrical quantity responding device of claim 18 wherein the voltage responsive switch device comprises a Zener diode, a thyristor, and connecting means connecting said Zener diode to said thyristor such that said second output current flows through said thyristor when the voltage magnitude across said Zener diode exceeds the breakover voltage of said Zener diode.

20. A detecting circuit for an electrical quantity sensing device for the protection of an alternating current network, said detecting circuit comprising:

an input circuit, said input circuit providing a DC voltage having a magnitude responsive to the magnitude of the electrical quantity in said alternating current network, and a time delay circuit connected with said input circuit such that an output electrical quantity is provided by said time delay circuit at a predetermined time TD after the magnitude of said DC input voltage exceeds a predetermined pickup value, said time delay circuit comprising circuit activating means, an RC network having at least one branch connected between input and output means, pulse generating means and counting means, said circuit activating means inhibiting and resetting the operation of said time delay circuit until the magnitude of said DC input voltage exceeds said pickup value, said RC network having its input means connected to be responsive to the DC voltage provided by said input circuit, said RC network providing an output at its output means responsive to the DC voltage, said pulse generating means providing a pulse when the output of said RC network reaches a predetermined value, with said pulse advancing said counting means and also resetting and freeing said RC network to again be responsive to the DC input voltage, said counting means providing said output electrical quantity upon receipt of a predetermined number of the pulses from said pulse generating means.

21. The detecting circuit of claim 20 wherein said pulse generating means comprises a monostable multivibrator and triggering means, said triggering means generating a voltage pulse when the output of the RC network reaches the predetermined level, with the voltage pulse having a magnitude sufficient to energize said monostable multivibrator, said monostable multivibrator providing, in response to said voltage pulse a rectangular pulse shaped voltage having a predetermined pulse width TD2, said rectangular pulse shaped voltage advancing the counting means and resetting the RC network.

22. The detecting circuit of claim 21 wherein the RC network includes resistive and capacitive elements, and reset means for momentarily deenergizing all of said capacitive elements, said RC network requiring, after said capacitive elements have been momentarily deenergized, a predetermined time period TD1 to generate an RC network voltage signal having a magnitude large enough to energize the triggering means, said time delay TD1 varying inversely with the magnitude of the DC input voltage.

23. The detecting circuit of claim 22 wherein the RC network comprises a plurality of parallel branches, each of said branches having resistive and capacitive elements, connecting means connecting said branches such that each of said branches provides a predetermined branch voltage having an inverse time characteristic, with the summation of said branch voltages providing the output of the RC network.

24. The detecting circuit of claim 20 wherein the counting means includes means for selecting the number of output pulses from the pulse generating means which will cause the counting means to provide the output electrical quantity.

25. The detecting circuit of claim 20 wherein the counting means includes binary counting means responsive to the output pulses from the pulse generating means, decade counting means connected to be responsive to said binary counting means, and selector switch means connected to said decade counting means for selecting a desired time scale reference curve.

26. A polyphase electrical quantity sensing device for use with a polyphase alternating current network, said sensing device comprising:

an input circuit, said input circuit providing a DC voltage having a magnitude responsive to the highest magnitude of the phase currents in said network, and a detecting circuit comprising a time delay circuit, said time delay circuit comprising an RC circuit having an input and output means, circuit activating means, pulse generating means and counting means, said circuit activating means inhibiting and resetting the operation of said time delay circuit until the magnitude of said DC input voltage exceeds a predetermined value, said RC network having its input means connected to be responsive to the DC voltage provided by said input circuit, said RC network providing an output at its output means responsive to the DC voltage, said pulse generating means providing a pulse when the output of said RC circuit exceeds a predetermined value, with said pulse advancing said counting means and resetting said RC circuit to again be responsive to the DC voltage, said counting means generating an output electrical quantity upon receipt of a predetermined number of pulses from said pulse generating means, to multiply the time delay of the RC circuit.

27. An electrical quantity responding device comprising:

a current transformer;

said current transformer including a primary winding adapted to be energized by an alternating current, and first and second output windings;

power supply means responsive to said first output winding;

current-sensing means responsive to said second output winding;

first and second rectifier means for providing unidirectional signals for the power supply means and for the current-sensing means, responsive to the outputs of the first and second output windings, respectively;

and control means controlling said first and second output windings to achieve substantially complete balancing of the ampere turns of the primary winding in a selected one of said first and second output windings, and then in the other, within the same half cycle of the alternating current, said control means including unidirectional means connected between the first rectifier means and the power supply means, switching means connected to the second rectifier means to activate and deactivate the second output winding in response to its conductive state, and means responsive to said power supply means for controlling the conductive state of said switching means, said unidirectional means effectively disconnecting the power supply means from the first rectifier means when said switching means activates the second output winding, to deactivate the first output winding.

28. An electrical quantity responding device comprising:

a current transformer;

said current transformer including a primary winding adapted to be energized by an alternating current, and first and second output windings;

power supply means responsive to said first output winding, said power supply means including energy storage means;

current-sensing means responsive to said second output winding;

first and second rectifier means for providing unidirectional signals for the power supply means and for the current-sensing means, responsive to the outputs of the first and second output windings, respectively;

and control means controlling said first and second output windings to achieve substantially complete balancing of the ampere turns of the primary winding in a selected one of said first and second output windings, and then in the other, within the same half cycle of the alternating current, said control means including unidirectional means connected between the first rectifier means and the power supply means, regulator means connected to regulate the voltage of said energy storage means, switching means connected to the second rectifier means to activate and deactivate the second output winding in response to its conductive state, and means responsive to said regulator means for controlling the conductive state of said switching means, said unidirectional means effectively disconnecting the power supply means from the first rectifier means when said switching means activates the second output winding, to deactivate the first output winding.

29. An electrical quantity responding device comprising:

a current transformer;

said current transformer including a primary winding adapted to be energized by an alternating current, and first and second output windings;

power supply means connected to be charged by said first output windings;

current-sensing means responsive to said second output winding;

and control means controlling said first and second output windings to achieve substantially complete balancing of the ampere turns of the primary winding in a selected one of said first and second output windings, and then in the other, within the same half cycle of the alternating current, said control means including regulator means responsive to the power supply means for providing a signal when the power supply means is charged by the first output winding, and including a controllable bridge rectifier connected to the second output winding, said controllable bridge rectifier being switched to a conductive state in response to the signal from said regulating means, to allow current flow through the second output winding and provide a unidirectional signal for the current-sensing means.

30. An electrical circuit for providing a predetermined current versus time response, comprising:

RC network means having at least one RC branch connected between input and output terminal means, means applying a DC input voltage to the input terminal means of said RC network means;

means applying a DC reference voltage to the output terminal means of said RC network means, said DC input voltage and said DC reference voltage both being in a charging relationship with said RC network means, with said DC input voltage and said DC reference voltage causing current to flow in said RC network means which results in current flow in a predetermined direction relative to said output terminal means when the DC reference voltage exceeds the DC input voltage;

said RC network means causing a predetermined change in said current at the output terminal means in response to the DC input voltage exceeding said DC reference voltage, with the time required to cause said predetermined change following the exceeding of the DC reference voltage by the DC input voltage being inversely proportional to the magnitude of said DC input voltage;

and detector means providing an output signal in response to the occurrence of said predetermined change in said current.

31. The electrical circuit of claim 30 wherein the detector means provides its output signal when the current flow into the output terminal means drops to zero.

32. The electrical circuit of claim 30 wherein the predetermined direction of the current caused by the DC reference voltage is into the output terminal means of the RC network means, with the detector means providing its output signal when the current into the output terminal means drops to zero.

33. The electrical circuit of claim 30 including a circuit breaker having trip setting means and trip actuating means, with the means providing the DC reference voltage being responsive to the trip setting means, and with the output of the detector means being applied to said trip actuating means.

34. The electrical circuit of claim 30 wherein the RC network means includes a plurality of RC branches connected in parallel between the input and output terminal means.

35. The electrical circuit of claim 34 wherein each RC branch has a different RC time constant.

36. An electrical circuit for providing a predetermined current versus time response, comprising:

RC network means having at least one RC branch connected between input and output terminal means, means applying a DC input voltage to the input terminal means of said RC network means, means applying a DC reference voltage to the output terminal means of said RC network means, said DC reference voltage causing current to flow in a predetermined direction relative to said output terminal means when the DC reference voltage exceeds the DC input voltage, said RC network means causing a predetermined change in said current in response to the DC input voltage exceeding said DC reference voltage, with the time required to cause said predetermined change following the exceeding of the DC reference voltage by the DC input voltage being inversely proportional to the magnitude of said DC input voltage, detector means providing an output signal in response to the occurrence of said predetermined change in said current, a circuit breaker having trip setting means and trip actuating means, pulse generating means, counting means, reset means for the RC network means, and decoding means, said means providing the DC reference voltage being responsive to said trip setting means, said pulse generating means providing a pulse when the detector means provides its output signal, said pulse advancing said counting means and causing said reset means to reset the RC network means and free it to again be responsive to the DC input voltage, said decoding means providing a trip signal for said trip actuating means in response to a predetermined count on said counting means, to multiply the time delay provided by the RC network means.

* * * * *